US008447269B2

(12) United States Patent
Joshi et al.

(10) Patent No.: US 8,447,269 B2
(45) Date of Patent: May 21, 2013

(54) SYSTEMS AND METHODS FOR JOINT ANALYTICS ON USER LEVEL AND NETWORK LEVEL DATA OF A COMMUNICATIONS NETWORK

(75) Inventors: Anupam Joshi, New Delhi (IN); Ravi Kothari, New Delhi (IN); Ankur Narang, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 12/957,497

(22) Filed: Dec. 1, 2010

(65) Prior Publication Data

US 2012/0142319 A1 Jun. 7, 2012

(51) Int. Cl.
*H04M 11/00* (2006.01)
(52) U.S. Cl.
USPC ............ 455/405; 455/406; 370/400; 709/218
(58) Field of Classification Search
USPC .................. 370/397, 905, 410, 522, 411, 420, 370/400; 526/260, 279; 375/369; 525/314; 709/218; 455/405, 406
See application file for complete search history.

(56) References Cited

U.S. PATENT DOCUMENTS

| | | | |
|---|---|---|---|
| 6,996,393 B2 * | 2/2006 | Pyhalammi et al. | 455/412.1 |
| 7,492,711 B1 | 2/2009 | Cheung et al. | |
| 7,685,311 B2 | 3/2010 | Friedman et al. | |
| 7,698,380 B1 * | 4/2010 | Amidon et al. | 709/218 |
| 8,238,905 B2 * | 8/2012 | Jiang | 455/432.1 |
| 2004/0044761 A1 * | 3/2004 | Phillipi et al. | 709/223 |
| 2007/0270132 A1 | 11/2007 | Poosala | |
| 2007/0270160 A1 | 11/2007 | Hampel et al. | |
| 2008/0089347 A1 * | 4/2008 | Phillipi et al. | 370/400 |
| 2008/0242221 A1 * | 10/2008 | Shapiro et al. | 455/3.06 |
| 2009/0011744 A1 * | 1/2009 | Daley et al. | 455/414.1 |
| 2009/0319329 A1 | 12/2009 | Aggarwal et al. | |
| 2010/0015946 A1 * | 1/2010 | Zhang | 455/406 |
| 2010/0057548 A1 | 3/2010 | Edwards | |

FOREIGN PATENT DOCUMENTS

WO 2007 124470 11/2007

OTHER PUBLICATIONS

Rysavy, Peter, "Data Capabilities for GSM Evolution to UMTS", Nov. 19, 2002, available at URL: http://www.rysavy.com/Articles/rysavy_data_paper.pdf, as of Aug. 4, 2010.
Zigkolis, Christos, et al., "Information analysis in mobile social networks for added-value services", position paper, available at URL: http://www.w3.org/2008/09/msnws/papers/mobile-social-data-analysis.pdf.
Kamvar, Maryann, et al., "Computers and iPhones and Mobile Phones, Oh My!", logs-based comparison of search users on different devices, available at URL: http://www2009.org/pdf/www2009_abstract_accepted_papers.pdf, as of Aug. 4, 2010.
Gomez-Barroso, Jose Luis, et al, "Prospects of Mobile Search", Institute for Prospective Technological Studies, JRC European Commission, EUR 24148 EN—2010, available at URL: http://ftp.jrc.es/EURdoc/JRC56100.pdf, as of Aug. 4, 2010.

* cited by examiner

*Primary Examiner* — Mahendra Patel
(74) *Attorney, Agent, or Firm* — Ference & Associates LLC

(57) ABSTRACT

Systems and associated methods provide for joint analytics on user level data and network level data. Systems and methods provide for accessing telecommunication network user level data and network level data and integrating analysis on both data types to produce a common result. Embodiments utilize joint analytics to generate patterns and rules concerning the content and services accessed by a user, when they are accessed, and how they are accessed.

12 Claims, 4 Drawing Sheets

SYSTEMS AND METHODS FOR JOINT ANALYTICS ON USER LEVEL AND NETWORK LEVEL DATA OF A COMMUNICATIONS NETWORK

BACKGROUND

An important function of modern telecommunication service companies is managing customer experience. Today, managing customer experience not only involves administering traditional network infrastructure and user accounts, but also includes providing efficient access to value added services (VAS). Typical VAS for cellular phones include ringtones, multimedia messaging, games, video downloading, and access to sports scores. In order to manage customer experience, telecommunication service companies store vast amounts of data pertaining to network users and the network itself. For example, user data may include call detail records (CDR), and use of VAS and short message service (SMS). Network data may include network switch information, base station data, and usage of edge caching devices for providing user content.

BRIEF SUMMARY

Systems and associated methods for joint analytics on user level data and network level data are described. Systems and methods provide for accessing telecommunication network user level data and network level data and integrating analysis on both data types to produce a common result. One example embodiment uses joint analytics to generate patterns and rules concerning the content and services accessed by a user, as well as when and how they are accessed. In addition, embodiments employ joint analytics over user and network data to improve network efficiency and customer experience for network users.

In summary, one aspect provides a method comprising: accessing network level data for at least one communication network; accessing user level data for at least one communication device and at least one communication network user; performing joint analytics on the user level data and the network level data to generate at least one analysis outcome; and applying the at least one analysis outcome to optimize the at least one communication network.

Another aspect provides a system comprising: at least one processor; and a memory operatively connected to the at least one processor; wherein, responsive to execution of computer readable program code accessible to the at least one processor, the at least one processor is configured to: access network level data for at least one communication network; access user level data for at least one communication device and at least one communication network user; perform joint analytics on the user level data and the network level data to generate at least one analysis outcome; and apply the at least one analysis outcome to optimize the at least one communication network.

A further aspect provides a computer program product a computer program product comprising: a computer readable storage medium having computer readable program code embodied therewith, the computer readable program code comprising: computer readable program code configured to access network level data for at least one communication network; computer readable program code configured to access user level data for at least one communication device and at least one communication network user; computer readable program code configured to perform joint analytics on the user level data and the network level data to generate at least one analysis outcome; and computer readable program code configured to apply the at least one analysis outcome to optimize the at least one communication network.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
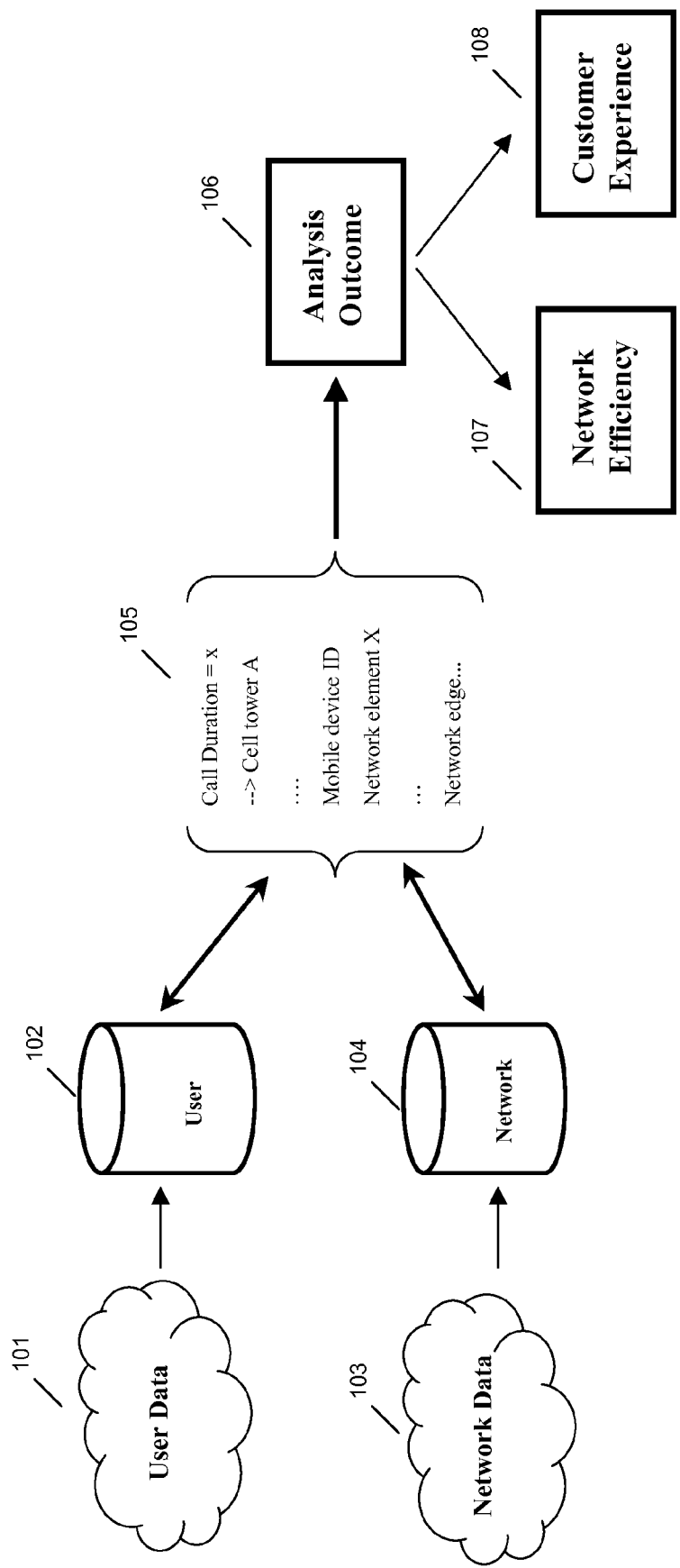
FIG. 1 illustrates an example embodiment.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of those embodiments.

Reference throughout this specification to "embodiment(s)" (or the like) means that a particular feature, structure, or characteristic described in connection with the embodiment is included in at least one embodiment. Thus, appearances of the phrases "according to embodiments" or "an embodiment" (or the like) in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that aspects can be practiced without one or more of the specific details, or with other methods, components, materials, et cetera. In other instances, well-known structures, materials, or operations are not shown or described in detail to avoid obfuscation.

Modern telecommunication service companies store vast amounts of data in order to improve management of customer experience. This information is segregated into various data types, with network data and user data being the two major types. User data involves information including CDR, event data records (EDR), use of SMS and VAS, and demographic, subscription and revenue data. In addition, CDR are comprised of information such as the number making the call, the number receiving the call, call date and time, call duration, call result (for example, answered, dropped, or busy), call network route, and call type (for example, voice or SMS). Network data is comprised of information connected with the switches, routers, base stations and edge caching devices that make up the network infrastructure. Essentially, network data is concerned with who connects to the network, from where, when, and for how long, as well as following the temporal evolution of network connection points, mobility traces, and network pathways.

Existing technology has employed a vast array of analysis techniques on user data and network data separately. Such analysis techniques include data mining, pattern recognition, clustering, association rules, collaborative filtering, active learning, and distributed approaches to optimization. Although there are a large number of user data and network data analysis techniques, user and network data have only been analyzed in isolation.

Integrating user and network data analysis would allow telecommunication companies to draw deeper insights into user behavior and how it effects service delivery and network element usage. In addition, joint user and network data analysis could be used to obtain greater network efficiencies from existing infrastructure investment and to enhance customer experience. Furthermore, such combined data analysis would allow for better customer experience management, including better targeted content, ads, VAS delivery at appropriate times and locations, and better usage experience due to lower dropped calls and greater network coverage.

The description now turns to the figures. The illustrated example embodiments will be best understood by reference to the figures. The following description is intended only by way of example and simply illustrates certain example embodiments representative of the invention, as claimed.

Embodiments provide for joint analytics over user level and network level data. According to embodiments, network level data analysis may be combined with user level data analysis to generate patterns and rules concerning the content and services accessed by a user, when they are accessed, and how they are accessed. Embodiments use joint analytics over user level and network level data to control delivery of content to a subject user, such that specific content is delivered at a selected time, location, and device.

Referring now to FIG. 1, therein is depicted an example embodiment. User data 101 is stored in a user data repository 102 and network data 103 is stored in a separate network data repository 104. Analytics 105 are run jointly on the user data 101 and the network data 103 to produce an analysis outcome 106. The analysis outcome 106 may be used to optimize network efficiency 107 or manage customer experience 108.

Figure 2:
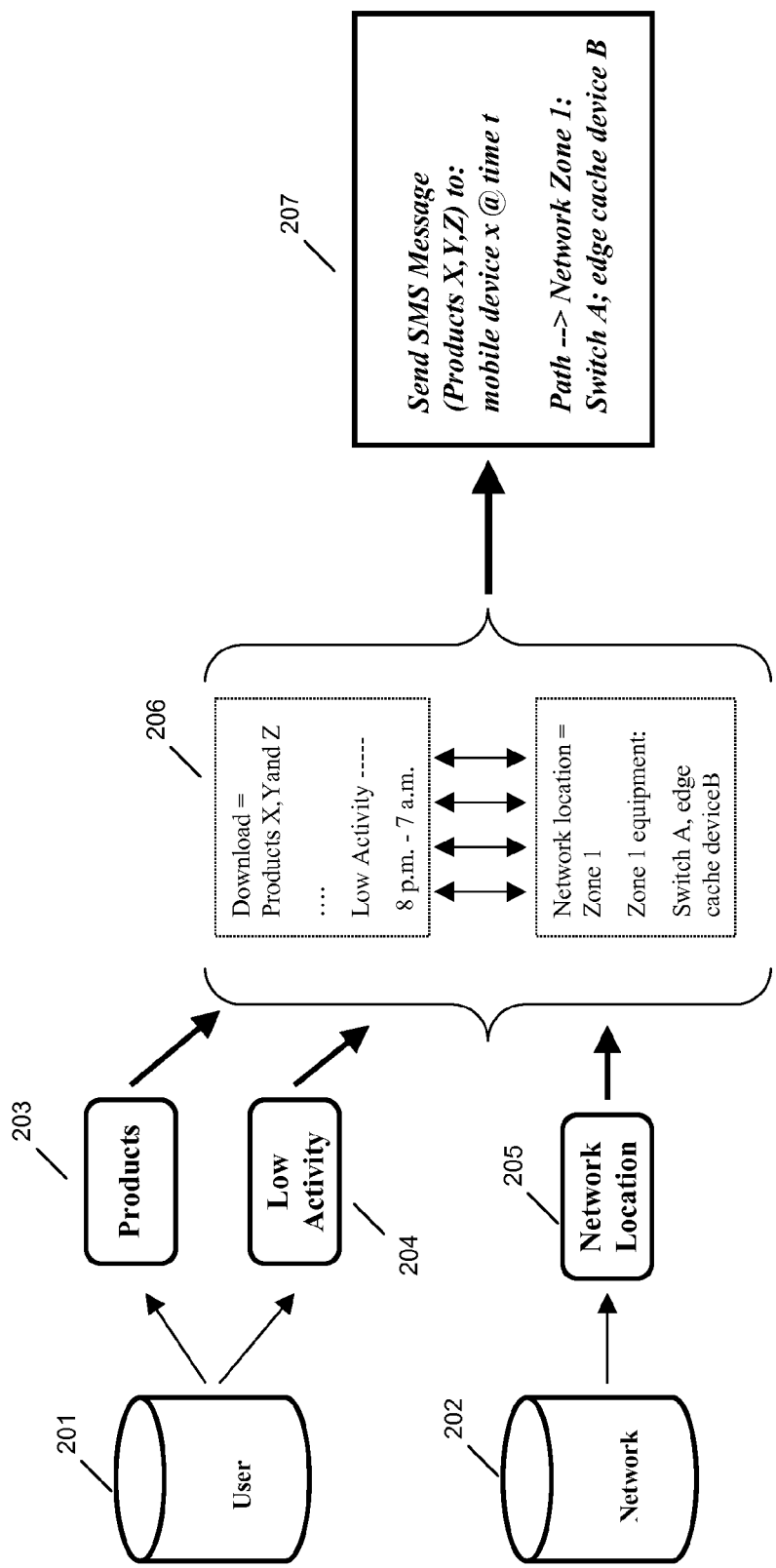
FIG. 2 illustrates an example involving a cellular phone user and a telecommunications services company.

Referring now to FIG. 2, therein is depicted a non-limiting example involving a cellular phone user and a telecommunications services company according to embodiments. User level data 201 indicates that a user is interested in a specific family of products 203, such as downloading games for mobile devices, and is currently in a period of low cellular phone activity 204. As a non-limiting example, the user's interest in a specific family of products 203 may be determined from analytics on user level data that indicates patterns concerning the user's past product interactions through their mobile device. In another non-limiting example, a user's mobile device activity patterns 204 may be determined by analytics on user level data, such as CDR that track the time and duration of mobile device activity. Network level data 202 may reveal where the user is located in the network 205. As a non-limiting example, network data analytics may show where a user is located in the network 205 by examining which cellular tower or towers are interacting with the user's mobile device. Joint analytics 206 on the user level data analytics 203, 204 and the network level data analytics 205 produces an analytics outcome 207. As a non-limiting example, the analytics outcome 207 may be to push out SMS advertisements to the mobile device containing information about updates concerning products of interest cached at an optimal zone in the network. Products of interest may include, but are not limited to, video clips and games.

Each mobile device in a telecommunications network has a unique ID that is stored in the user level data. As a non-limiting example, the unique ID may be a cellular phone number. In addition, this unique ID may be an element of each CDR corresponding to the mobile device. However, network level records may not store the unique ID for a mobile device. Nonetheless, they may have a field that corresponds to the unique ID such that the network record may be traced back to the related mobile device.

Embodiments provide for correlating user level records with network level records in order to perform joint analytics. Embodiments provide for building relationships between user level data and network level data such that certain user level data may correspond with certain network level data. According to embodiments, templates involving specific user level data and network level data may be devised for performing joint analytics on the network and user data. In addition, certain algorithms may be developed to perform joint analytics on the network and user data.

Figure 3:
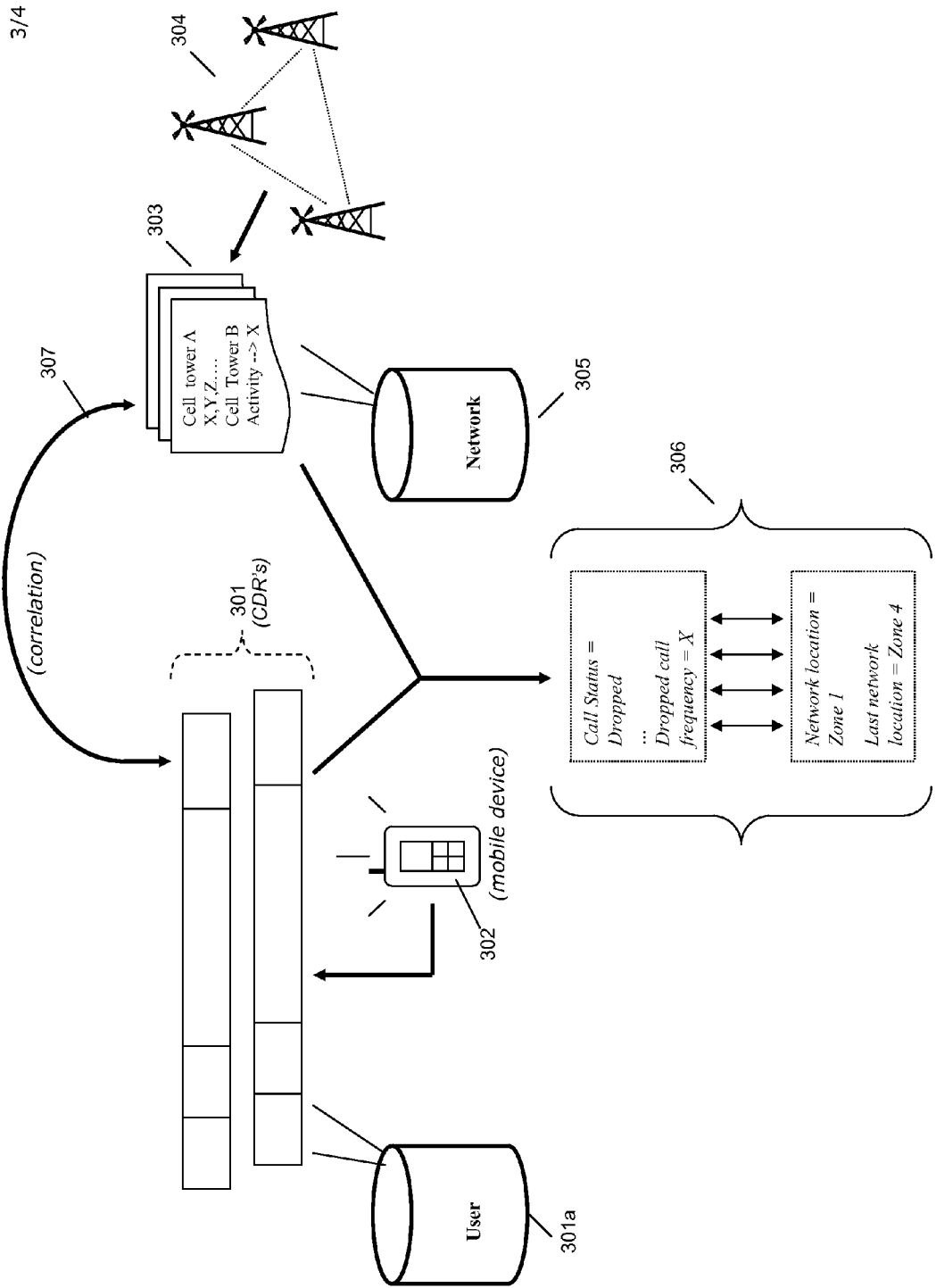
FIG. 3 illustrates an example involving CDR user level data.

Referring now to FIG. 3, therein is depicted an example embodiment involving CDR user level data. CDR 301 for a mobile device 302 are stored as user level data 301a. Network activity records 303 for a telecommunications network 304 are stored as network level data 305. CDR 301 for the mobile device 302 are correlated 307 with network activity records 303 for the mobile device 302. Joint analytics 306 are performed utilizing the data obtained from the CDR 301 and the network activity records 303. As a non-limiting example, CDR 301 may reveal that a call for the mobile device 302 was dropped and that dropped calls frequently occur on this particular mobile device 302, even though the mobile device belongs to a highly valued customer. In addition, the network activity records 303 may reveal where the mobile device 302 is located and the direction that the mobile device 302 is travelling within the telecommunications network 304. Thus, joint analytics according to embodiments provide that the telecommunications network 304 may attempt to reconnect the mobile device 302 because a dropped call has occurred and, in addition, recognize where to look for the mobile device 302 in the network.

Mobile device users within a telecommunications network will now serve for the following non-limiting examples. A first non-limiting example involves a mobile device user whose user level data reveals preferred content, which may include, but is not limited to, ringtones, games, videos, and sports scores. In addition, network level data may indicate where the mobile device user typically downloads the preferred content. As such, embodiments provide that the preferred content may be staged or cached at a network edge near the potential download site, instead of forcing the user to download from a default central location.

A second non-limiting example involves data concerning how user density evolves over time at specific network locations. For example, user density may include, but is not limited to, the user density of different classes of network users. In this example, network coverage may be proactively increased or decreased (for example, through beam steering) and network backhaul utilized (for example, Dense Wavelength Division Multiplexing, or DWDM). In addition, admission control may be utilized to prioritize a call from a valued user about to be handed from a nearby network cell over a new call.

As a third non-limiting example, network level data may indicate that a large number of network traffic follows a certain pattern at a specific time of day. For example, rush hour traffic into a major metropolitan area during typical morning commute times. Utilizing network level data alone, the telecommunications network may be configured to beam steer network coverage in the direction of the most network traffic. However, user level data may reveal that a large number of 'important' customers would be adversely affected if the network coverage were steered in the direction of the most network traffic. Important customers may be defined in various ways, including customer account size, usage of VAS, or revenue data. According to embodiments, joint analytics on the user level data and the network level data may indicate that the best solution is not to beam steer coverage away from the location of the important customers. Thus, network optimization may occur through joint analytics according to embodiments in ways that may not be realized through analytics of network level or user level data in isolation.

A fourth non-limiting example involves mining mobility traces and making the mobility traces available as services to third parties. For example, mobility traces may be utilized by third parties such as traffic management authorities or public transport systems.

Embodiments provide for joint analytics of user level data and network level data. According to embodiments, joint analytics are used to find patterns and rules concerning the content and services accessed by a mobile device, where it is accessed, when it is accessed, and how (for example, using what device) it is accessed. Further embodiments utilize joint analytics to control delivery of content to a mobile device so that content is delivered at a selected time, location and mobile device. Integrated analysis of user level data and network level data is utilized by embodiments to cache content at the appropriate network edge device. Embodiments use joint analytics to ensure service delivery meets or exceeds service level agreements (SLA), including, but not limited to, reserving resources or enabling redundancy. Joint analytics on user level and network level data are used by embodiments to predict the evolution of network usage, predict the resource needs at the network and system layers, optimize usage, and dynamically alter resource usage to meet real time service quality needs. Embodiments provide that usage and network data need not be centralized, but the analysis may be done on the distributed data.

Figure 4:
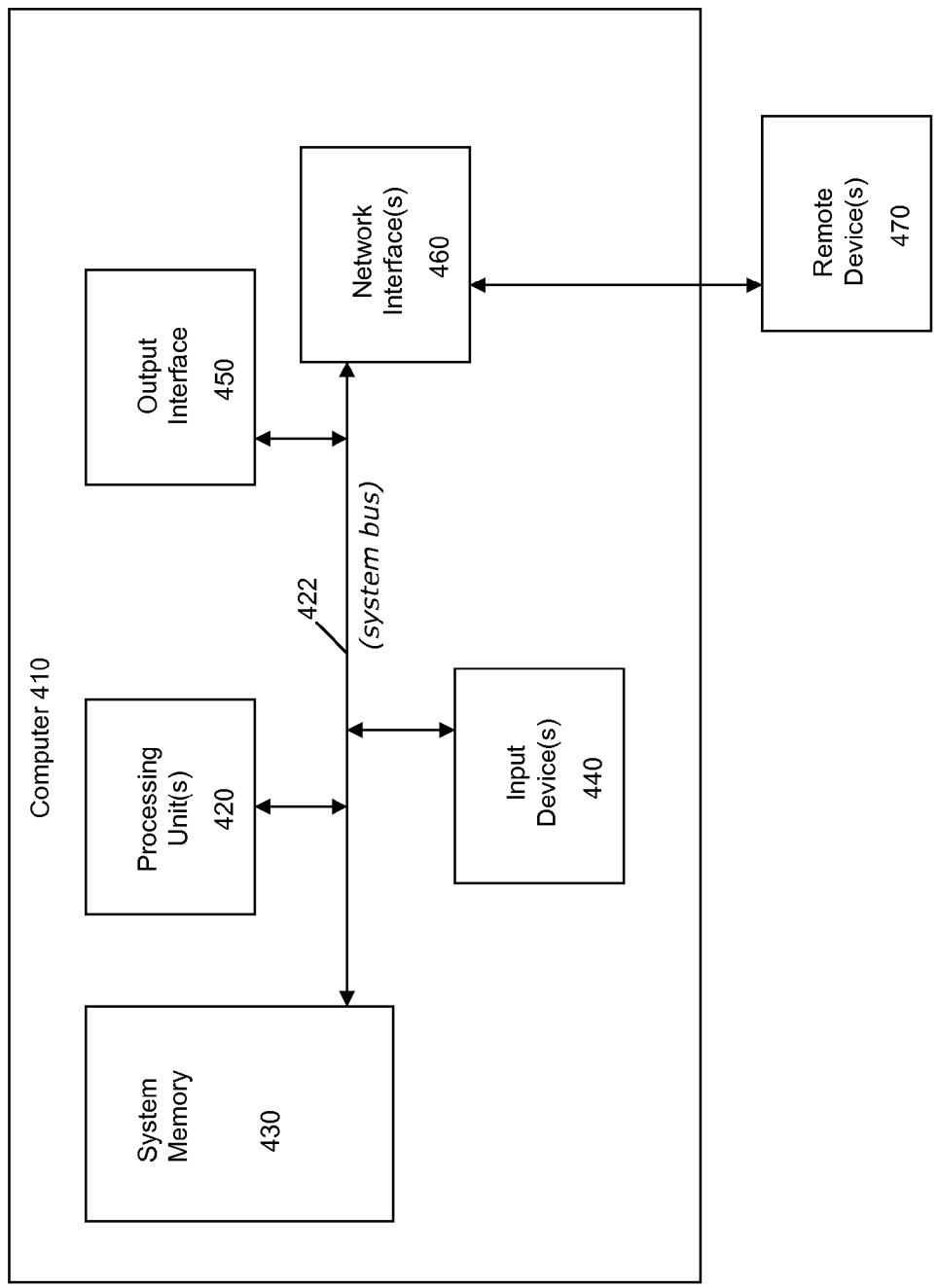
FIG. 4 illustrates an example computer system.

Referring to FIG. 4, it will be readily understood that certain embodiments can be implemented using any of a wide variety of devices or combinations of devices. An example device that may be used in implementing one or more embodiments includes a computing device in the form of a computer 410. In this regard, the computer 410 may execute program instructions configured to create a historical database, extract candidate information, enumerate relevant position features, rank candidates according to fitness score, and perform other functionality of the embodiments, as described herein.

Components of computer 410 may include, but are not limited to, a processing unit 420, a system memory 430, and a system bus 422 that couples various system components including the system memory 430 to the processing unit 420. The computer 410 may include or have access to a variety of computer readable media. The system memory 430 may include computer readable storage media in the form of volatile and/or nonvolatile memory such as read only memory (ROM) and/or random access memory (RAM). By way of example, and not limitation, system memory 430 may also include an operating system, application programs, other program modules, and program data.

A user can interface with (for example, enter commands and information) the computer 410 through input devices 440. A monitor or other type of device can also be connected to the system bus 422 via an interface, such as an output interface 450. In addition to a monitor, computers may also include other peripheral output devices. The computer 410 may operate in a networked or distributed environment using logical connections to one or more other remote computers or databases. The logical connections may include a network, such local area network (LAN) or a wide area network (WAN), but may also include other networks/buses.

It should be noted as well that certain embodiments may be implemented as a system, method or computer program product. Accordingly, aspects may take the form of an entirely hardware embodiment, an entirely software embodiment (including firmware, resident software, micro-code, et cetera) or an embodiment combining software and hardware aspects that may all generally be referred to herein as a "circuit," "module" or "system." Furthermore, aspects may take the form of a computer program product embodied in one or more computer readable medium(s) having computer readable program code embodied therewith.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, et cetera, or any suitable combination of the foregoing.

Computer program code for carrying out operations for various aspects may be written in any combination of one or more programming languages, including an object oriented programming language such as Java™, Smalltalk, C++ or the like and conventional procedural programming languages, such as the "C" programming language or similar programming languages. The program code may execute entirely on a single computer (device), partly on a single computer, as a stand-alone software package, partly on single computer and partly on a remote computer or entirely on a remote computer or server. In the latter scenario, the remote computer may be connected to another computer through any type of network, including a local area network (LAN) or a wide area network (WAN), or the connection may be made for example through the Internet using an Internet Service Provider.

Aspects are described herein with reference to flowchart illustrations and/or block diagrams of methods, apparatuses (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

What is claimed is:

1. A method of optimizing network traffic efficiency, said method comprising:
   accessing network level data for at least one communication network, the at least one communication network comprising at least one wireless telecommunication network;
   accessing individual user level data for at least one communication device and at least one predetermined customer;
   performing joint analytics on the user level data and the network level data to generate at least one analysis outcome; and
   applying the at least one analysis outcome to optimize data delivery to the at least one predetermined customer;
   said applying comprising employing the at least one analysis outcome to improve network efficiency for at least one communication network and improve customer experience for at least one communication device corresponding to at least one predetermined customer;
   wherein improving network efficiency comprises storing content at a network edge location, the network edge location being disposed near a download site relating to the at least one preselected customer and away from a default central location;
   wherein improving network efficiency further comprises calculating resource needs of the at least one communication network; and
   wherein improving customer experience comprises at least one of: providing targeted content to a customer; providing targeted ads to a customer; delivering value-added services; decreasing dropped calls; affording greater network coverage.

2. The method according to claim 1, wherein the at least one communication device comprises at least one cellular phone.

3. The method according to claim 1, wherein the user level data comprises call data records, simple messaging system records, value added services records, demographic information, subscription information, and revenue information.

4. The method according to claim 1, wherein the network level data comprises network switch information, base station data, edge caching device usage, user identification, user communication location, and user communication duration.

5. The method according to claim 1, wherein improving network efficiency comprises beam steering network traffic to favor access by the at least one predetermined customer.

6. A system comprising:
   at least one processor; and
   a memory operatively connected to the at least one processor;
   wherein, responsive to execution of computer readable program code accessible to the at least one processor, the at least one processor is configured to:
   access network level data for at least one communication network, the at least one communication network comprising at least one wireless telecommunication network;
   access individual user level data for at least one communication device and at least one predetermined customer;
   perform joint analytics on the user level data and the network level data to generate at least one analysis outcome; and
   apply the at least one analysis outcome to optimize data delivery to the at least one predetermined customer, the applying comprising employing the at least one analysis outcome to improve network efficiency for at least one communication network and improve customer experience for at least one communication device corresponding to at least one predetermined customer;
   wherein improving network efficiency comprises storing content at a network edge location, the network edge location being disposed near a download site relating to the at least one preselected customer and away from a default central location;
   wherein improving network efficiency further comprises calculating resource needs of the at least one communication network; and
   wherein improving customer experience comprises at least one of: providing targeted content to a customer; providing targeted ads to a customer; delivering value-added services; decreasing dropped calls; affording greater network coverage.

7. The system according to claim 6, wherein the at least one communication device comprises at least one cellular phone.

8. The system according to claim 6, wherein the user level data comprises call data records, simple messaging system records, value added services records, demographic information, subscription information, and revenue information.

9. The system according to claim 6, wherein the network level data comprises network switch information, base station data, edge caching device usage, user identification, user communication location, and user communication duration.

10. A computer program product comprising:
a non-transitory computer readable storage medium having computer readable program code embodied therewith, the computer readable program code comprising:
computer readable program code configured to access network level data for at least one communication network, the at least one communication network comprising at least one wireless telecommunication network;
computer readable program code configured to access individual user level data for at least one communication device and at least one predetermined customer;
computer readable program code configured to perform joint analytics on the user level data and the network level data to generate at least one analysis outcome; and
computer readable program code configured to apply the at least one analysis outcome to optimize data delivery to the at least one communication network user, the applying comprising employing the at least one analysis outcome to improve network efficiency for at least one communication network and improve customer experience for at least one communication device corresponding to at least one predetermined customer;
wherein improving network efficiency comprises storing content at a network edge location, the network edge location being disposed near a download site relating to the at least one preselected customer and away from a default central location;
wherein improving network efficiency further comprises calculating resource needs of the at least one communication network; and
wherein improving customer experience comprises at least one of: providing targeted content to a customer; providing targeted ads to a customer; delivering value-added services; decreasing dropped calls; affording greater network coverage.

11. The method according to claim 1, wherein improved customer experience comprises at least one member selected from the group consisting of: customized data delivery; and data delivery efficiency.

12. The system according to claim 6, wherein improved customer experience comprises at least one member selected from the group consisting of: customized data delivery; and data delivery efficiency.

* * * * *